Aug. 29, 1939.   H. F. BROWN   2,171,022
INDICATOR
Filed June 3, 1937
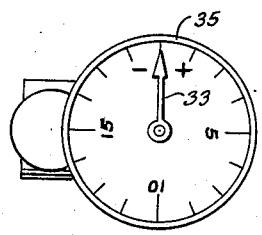
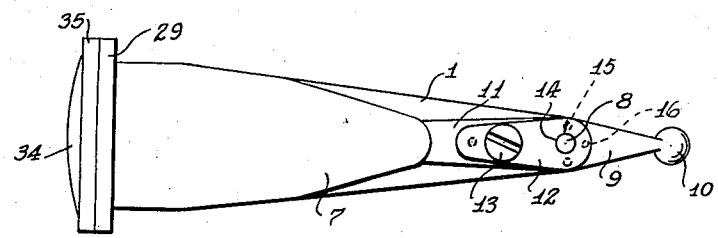
Harry F. Brown
INVENTOR.
BY
ATTORNEY.

Patented Aug. 29, 1939

2,171,022

UNITED STATES PATENT OFFICE 2,171,022

INDICATOR

Harry F. Brown, Detroit, Mich.

Application June 3, 1937, Serial No. 146,145

9 Claims. (Cl. 33—172)

This invention relates to a gage of particular utility in connection with machine operations involving cutting, grinding, boring and the like wherein it is necessary to know the exact amount of material being removed during the machining process.

A specific object is to provide a work contacting finger and an indicating hand connected together by a linkage which includes gear teeth and to so arrange the gears that they are retained in light pressure contact thereby responding accurately to movements of the contact finger, the linkage leverages and the gears being so proportioned that the indicating hand may make one complete revolution in response to the maximum movement of the contact finger.

Another object is to employ bevel gearing, the pressure means which urges the gears together being also employed to maintain the gears in continuous contact with their thrust bearings thereby precluding lost motion clearances due to the use of gears.

A further object is to provide a dial which may be rotated with its retaining casing about its axis whereby it may be set to zero or to any desired starting point with respect to its hand. The dial also bears indicating means to clearly slow the positive and return directions of rotation.

Another object is to provide an improved novel type bearing construction serving several functions,—namely, as a thrust bearing and radial bearing for one of the gears, as a retainer means and also as a bearing for the dial housing, and, in conjunction with a set screw, as a means for retaining one gear and the dial in assembly with each other and with the main indicator frame or casing.

A still further object of the invention is to provide a dial, dial hand and shaft, bearing and bevel gear which may be removed or replaced as a single assembly.

Another important object is to provide a work contacting finger movable about a fixed pivot, an intermediate link member operatively connected to the inner end of said finger and movable in response to movements of said finger, and means for adjusting the initial angular position of said finger with respect to said linkage, the finger and said means being so constructed that there will be uniform response of the intermediate link to indicating movements of said finger regardless of the angle of contact of the finger with a piece of work undergoing measurement. In this connection it will be understood that an indicator of this type is expected to be applied to the work from any angle whatever and it is highly important that there be no variation in readings merely because the work may be approached from a new direction.

Other objects and advantages, either directly described or indirectly accruing from the favorable arrangement of parts and details of construction will become hereinafter more fully apparent as reference is had to the accompanying drawing wherein my invention is illustrated by way of example, and in which:

Fig. 1 is an endwise elevation,

Fig. 2 is a top plan view,

Fig. 3 is a longitudinal sectional view taken parallel to the top along the line 3—3 of Fig. 4, Fig. 4 is a longitudinal section taken along the line 4—4 of Fig. 3, the view being up-side-down with respect to Fig. 1, the parts being shown in aligned position.

Fig. 5 is a side view of the indicator attached to my improved mounting.

More particularly, 1 indicates the frame or housing which consists of a solid bottom wall 2 having a stepped portion 3, an end wall 4 having a central threaded opening 5 therethrough, side walls 6 integral therewith and converging toward the rear end thereof, and a removable top wall 7 of less length than the walls 2 and 6. The rear end of the casing is open and a pin 8 is fixed in the bottom wall 2 near the rear end of the wall 2. A contact finger 9, preferably with a spherical outer end 10 is mounted for rotation on the pin 8, through an arc parallel with the plane of the wall 2. Between the finger 9 and the wall 2 an intermediate link 11 is also journalled on the pin 8 to rotate or swing through an arc parallel with the arc of swinging of the finger 9. In order to maintain the parts 9 and 11 in operative engagement a spring piece 12 is secured to the part 11 by a screw 13, substantially removed from the pin 8. The outer end of this piece 12 has an opening 14 to receive the pin 8 and at diametrically spaced points are two or more small pins 15 which find engagement with indentations 16 in the finger 9.

There are a multiplicity of indentations 16 in the finger 9 so that the piece 12 may be bent downwardly (Fig. 4) and the finger 9 rotated through a substantial arc whereupon the spring piece may be released so that the pins 15 may find engagement with a new set of indentations 16. In this way the finger 9 may assume a multiplicity of initial positions with respect to the link part 11 and after any setting pressure on the finger 9 will cause responsive movement by the part 11.

The end of the link part 11 opposite the pin 8 is pivotally secured by a pin 17 to the main or gearing bearing link 18 at a point between the ends of the link 18. This part 18 is pivotally mounted at one end on a pin 19 fixed in the wall 2 and at the other end is fixedly engaged to a gear segment 20. Fixedly secured in the end wall 4 of the casing 1 at 21 is a spring 22 which is normally under tension and also under torsion in order to serve several functions. The end of this spring, at its end away from the anchorage 21 has a pin 23 (or is merely bent in similarity of a pin formation) which engages an opening provided for the purpose in the link 18. The spring, by virtue of its initial torsion, urges one end of the link 18 onto the pin 19 and the other end or gear segment 20 into pressure engagement with a bevel gear 24. The spring 22 also acts to oppose swinging movements of the arm 18 on the pin 19 and therefore acts as a return means for the linkage 18, 11, 12, 9 after movements thereof. The spring 22 has the further function of urging the bevel gear 24 against its thrust bearing 25, the rear side 26 of the gear being of frusto-conical shape.

The gear 24 has a shaft 27 which is journaled in the bearing 25, the bearing being tapered for contact with the portion 26 thus serving both as a radial bearing and as a thrust bearing. The bearing is externally threaded for reception by the threaded opening 5 through the wall 4, the rear end being flared preferably at an angle of about 45°, for reception by a beveled opening 28 in a retainer or housing 29 for a dial 30. The housing 29 is rotatable with respect to the conical bearing portion 31, the dial so being pinned thereto at 32 for rotation therewith. An indicator hand 33 is fixedly mounted on the shaft 27 for rotation therewith. By rotation of the housing 29 the dial can therefore be rotated to position any desired indication of the dial as the starting position of the hand 33.

The dial 30 is given markings as illustrated in Fig. 1 such that the movement of the finger 9 is represented on the dial in thousandths of an inch. It will be noted that plus and minus signs also appear on the dial in order that the direction of rotation of the hand may be easily discerned. In order to protect the dial 30 a transparent covering 34 is retained thereover by a retainer ring 35 in frictional engagement with the outer surface of the housing 29.

It will be observed that the housing 29 with the dial 30, and the gear 24 with its shaft 27 and the hand 33 are in unitary assembly with the bearing 25. In order to retain the assembly in position in the wall 4 a lock screw 47 is provided, the assembly being removable by loosening this screw.

As a means for mounting the indicator on a machine a member 36 having a threaded shank 37 is screwed into the opening 38 provided for the purpose in the base 2. The member 36 has an axial bore 39 to receive a rod 40 which is bent at its outer end 41 for attachment to a height gauge bar 42. A screw 43 having a knurled head screws into the member 36 and locks the rod 40 in place therewith. The member 36 has a second bore 44 normal to and intersecting the bore 39 opposite the end of the screw 43. The rod 40 may be removed from the position illustrated in Fig. 4 and inserted into the bore 44 as illustrated in Fig. 5. It is then pivotally attached at its outer end to a link 45 which is, in turn pivotally attached to an arm 46. The arm 46 may be secured to a boring mill or to any machine hereinbefore contemplated. The bend in the arm 41 is such that the dial is centered with respect to the line of measurement so that the eye of a reader will be required to shift a minimum amount from looking at the work to glancing at the dial. This attachment permits bodily swinging through a wide range and rotation from any position, the part 36 being rotatable in its opening 38.

What I claim is:

1. An indicator comprising a housing, a contact finger pivotally mounted in said housing, an indicator hand, and a linkage connecting said finger and said hand, said linkage comprising a link having a gear segment secured to one end thereof and a gear wheel rotatably mounted in said casing in continuous mesh with said gear segment, said gear wheel being of bi-conical shape with one face thereof being toothed and the other face thereof being smooth, a conical bearing for said smooth face, and spring means co-acting with said sector to constantly press said smooth face against its bearing.

2. An indicator comprising a housing, a contact finger pivotally mounted in said housing, an indicator hand, and a linkage connecting said finger and said hand, said linkage comprising a link having a gear segment secured to one end thereof and a gear wheel rotatably mounted in said casing in continuous mesh with said gear segment, said gear wheel being of bi-conical shape with one face thereof being toothed and the other face thereof being smooth, a conical bearing for said smooth face, said sector having teeth shaped to co-act under pressure with the toothed face of the gear wheel to bias movement of the gear wheel toward said bearing, spring means urging said segment into pressure engagement with said toothed face and thereby urging said smooth face in pressure contact with its bearing.

3. An indicator comprising a housing, a contact finger pivotally mounted in said housing, an indicator hand, and a linkage connecting said finger and said hand, said linkage comprising a link having a gear segment secured to one end thereof and a gear wheel rotatably mounted in said casing in continuous mesh with said gear segment, said gear wheel being of bi-conical shape with one face thereof being toothed and the other face thereof being smooth, said sector having teeth shaped to coact under pressure with the toothed face of the gear wheel to bias movement of the gear wheel toward said seat, a conical bearing for said smooth face, a spring anchored in said casing at one end and contacting said link at its other end, said spring acting in a direction to urge said segment into pressure contact with said toothed face and thereby to urge said smooth face toward said conical bearing.

4. An indicator comprising a housing, a contact finger pivotally mounted in said housing, an indicator hand, and a linkage connecting said finger and said hand, said linkage comprising a link having a gear segment secured to one end thereof and a gear wheel rotatably mounted in said casing in continuous mesh with said gear segment, said gear wheel being of bi-conical shape with one face thereof being toothed and the other face thereof being smooth, said sector having teeth shaped to coact under pressure with the toothed face of the gear wheel to bias movement of the gear wheel toward said seat, a conical bearing for said smooth face, a spring having one end anchored in said casing and its other end anchored in said link, and constituting a return spring for said linkage, said spring being under initial torsion and being anchored to the segment carrying link in such manner that the energy stored in torsion is effective in a direction to urge said segment into pressure engagement with said toothed surface.

5. An indicator comprising a casing or frame, a work contacting finger, an indicator hand, motion multiplying means connecting said finger and said hand including a gear wheel having a beveled rear portion to the shaft of which said hand is secured, a bearing for said gear wheel having external threads engaging threads of a hole through a wall of said casing, means for locking said bearing in a selected position with respect to said hole, said bearing having a tapered opening for receiving said gear wheel whereby said bearing serves as both a thrust and radical bearing.

6. An indicator comprising a casing or frame, a work contacting finger, an indicator hand, motion multiplying means connecting said finger and said hand including a bevel gear having a biconical shape with one face thereof being toothed and the other face being smooth, said smooth face terminating in a gear shaft to which said hand is secured, a bearing for said gear having an internal cylindrical portion, a bevelled internal portion for contact with said smooth face thereby constituting both a thrust bearing and a radical bearing and an externally threaded portion for engagement with threads of a hole through a wall of said casing.

7. An indicator comprising a casing or frame, a work contacting finger, an indicator hand, motion multiplying means connecting said finger and said hand including a gear wheel to the shaft of which said hand is secured, a bearing positioned in one wall of said casing, a dial for said hand, and a housing for said dial and said hand, said shaft being rotatable in said bearing, said housing being rotatable on said bearing.

8. An indicator comprising a casing or frame, a work contacting finger, an indicator hand, motion multiplying means connecting said finger and said hand including a gear wheel to the shaft of which said hand is secured, a bearing externally threaded for engagement with threads of a hole through a wall of said casing and terminating in a flared conical portion exteriorly of said wall, a dial for said hand, a housing having a transparent cover for said dial and said hand, said housing having a conical seat for the conical end of said bearing, said bearing by its shape retaining said housing in relatively rotatable assembly therewith, and means for locking said bearing in position in its wall.

9. An indicator comprising a casing or frame, a work contacting finger, an indicator hand, motion multiplying means connecting said finger and said hand including a bevel gear having a biconical shape with one face thereof being toothed and the other face being smooth, said smooth face terminating in a gear shaft to which said hand is secured, a bearing for said gear having an internal cylindrical portion, a bevelled internal portion for contact with said smooth face thereby constituting both a thrust bearing and a radial bearing and an externally threaded portion for engagement with threads of a hole through a wall of said casing, the external surface of said bearing terminating in a flared conical portion, a dial for said hand, a housing for said dial and hand having a transparent cover, said housing having a conical seat for the conical end of said bearing, said bearing by its shape retaining said housing in relatively rotatable assembly therewith, and means for locking said bearing in place in its wall, said bearing being removable from said wall upon loosening of said means in assembly with said housing, said hand, dial and said bevel gear.

HARRY F. BROWN.